(12) United States Patent
Nichols (10) Patent No.: US 7,722,104 B2
(45) Date of Patent: May 25, 2010

(54) MOBILE TARGET RANGE TRAILER

(76) Inventor: Tony Nichols, 5719 N. Wyoming, Kansas City, MO (US) 64118

( * ) Notice: Subject to any disclaimer, the term of this patent is extended or adjusted under 35 U.S.C. 154(b) by 503 days.

(21) Appl. No.: 11/307,436

(22) Filed: Feb. 7, 2006

(65) Prior Publication Data

US 2007/0182185 A1 Aug. 9, 2007

(51) Int. Cl.
*B60P 3/34* (2006.01)
(52) U.S. Cl. .................................. 296/26.08
(58) Field of Classification Search .............. 296/26.08, 296/26.09, 165, 170–173, 175, 176, 26.12, 296/26.13; 52/67
See application file for complete search history.

(56) References Cited

U.S. PATENT DOCUMENTS

| | | | | |
|---|---|---|---|---|
| 3,106,750 A | * | 10/1963 | Jarman | 52/67 |
| 3,116,085 A | * | 12/1963 | Uttley | 296/26.09 |
| 3,137,041 A | * | 6/1964 | Mullen | 52/67 |
| 3,212,810 A | * | 10/1965 | Bass | 296/171 |
| 3,966,075 A | * | 6/1976 | Schultz | 220/1.5 |
| 4,192,544 A | * | 3/1980 | Patterson | 296/165 |
| 7,052,064 B2 | * | 5/2006 | Rasmussen | 296/26.01 |

OTHER PUBLICATIONS

Meggitt Defense Systems, Caswell, Information Packet from Meggitt Defense Systems, Drawing, Jun. 3, 2001, Minneapolis, MN.

* cited by examiner

*Primary Examiner*—H Gutman
(74) *Attorney, Agent, or Firm*—Hovey Williams LLP (57) ABSTRACT

Embodiments of the present invention provide a mobile target range trailer. The mobile target range trailer includes an extendible main body having telescopically intercoupled outer and inner sections, a hitching element coupled to the main body proximate a first end of the body, and a plurality of wheels coupled to the main body proximate a second end of the body. The outer and inner section of the main body cooperatively define an interior space. The main body is shiftable between a retracted position and an extended position to increase the maximum dimension of the interior space. Such a configuration enables the trailer to be transported in a retracted position and shifted to an extended position while stationary to provide an increased interior space for targeting.

9 Claims, 9 Drawing Sheets

MOBILE TARGET RANGE TRAILER

BACKGROUND OF THE INVENTION

1. Field of the Invention

The present invention relates to mobile target ranges. More particularly, the invention relates to a mobile target range trailer having telescopically intercoupled sections that cooperatively define a variable interior space.

2. Description of the Related Art

Individuals often seek to fire weapons, such as firearms or bows, at target ranges for sport, training, practice, or testing. Target ranges are typically large outdoor areas in which weapons may be safely discharged without risk of damage to nearby property or people. As outdoor target ranges must be positioned in sparsely populated areas, they are often difficult to conveniently and easily access. Thus, indoor ranges contained within buildings have been developed to provide more convenient access and firing opportunities. However, building codes, zoning and environmental regulations, and construction costs limit the use of indoor ranges.

To overcome these problems with outdoor and indoor target ranges, mobile target ranges have been developed that may be transported to provide target ranges at any location. These mobile target ranges typically consist of a trailer that may be towed by a motor vehicle. As various U.S. state and federal regulations generally limit the length of a single trailer to fifty-three feet, these mobile ranges are typically limited to a maximum interior dimension of forty feet, significantly less than the typical range dimension of seventy-five feet. Thus, sporting, training, practice, and testing opportunities are often limited by the miniature dimensions provided by mobile target ranges.

SUMMARY OF THE INVENTION

The present invention solves the above-described problems and provides a distinct advance in the art of mobile target ranges. More particularly, the invention provides a mobile target range trailer having telescopically intercoupled sections that cooperatively define a variable interior space. Such a configuration enables the trailer to be transported in a retracted position and shifted to an extended position while stationary to provide an increased interior space for targeting.

One embodiment of the mobile target range trailer includes an extendible main body having telescopically intercoupled outer and inner sections, a hitching element coupled to the main body proximate a first end of the body, and a plurality of wheels coupled to the main body proximate a second end of the body. The outer and inner sections of the main body cooperatively define an interior space. The main body is shiftable between a retracted position and an extended position and the maximum dimension of the interior space increases by at least about twenty percent when the main body is shifted from the retracted position to the extended position.

In another embodiment, the mobile target range trailer includes an extendible main body having telescopically intercoupled outer and inner sections, a hitching element coupled to the main body proximate a first end of the body, and a plurality of wheels coupled to the main body proximate a second end of the body. The outer and inner sections of the main body cooperatively define an interior space. The main body is shiftable between a retracted position and an extended position and the inner section is operable to be completely retained within the outer section when the main body is in the retracted position. The maximum dimension of the main body does not exceed approximately fifty-three feet when the main body is in the retracted position and the maximum dimension of the interior space is at least sixty feet when the main body is in the extended position. The trailer additionally includes a mechanical driver to shift the main body between the retracted and extended positions and a ballistic panel and sloped projectile stop positioned within the interior space.

In another embodiment, the present invention provides a method of operating a mobile target range trailer having telescopically intercoupled inner and outer sections that cooperatively define an interior space. The method generally includes shifting the trailer from a retracted position to an extended position to increase the maximum dimension of the interior space by at least about twenty percent. The method additionally may include shifting the trailer from the extended position to the retracted position to facilitate transport of the trailer, positioning a plurality of targets and a ballistic panel in the trailer, and firing a weapon in the interior space when the trailer is in the extended position.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
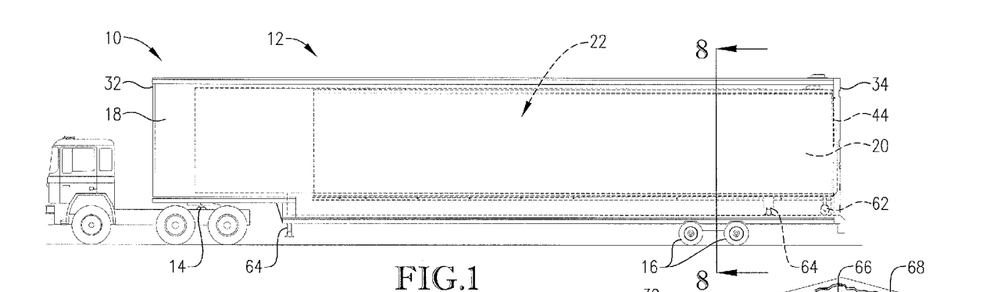
FIG. 1 is a side view of a mobile target range trailer configured in accordance with various preferred embodiments of the present invention, the trailer being shown in a retracted position.
Figure 2:
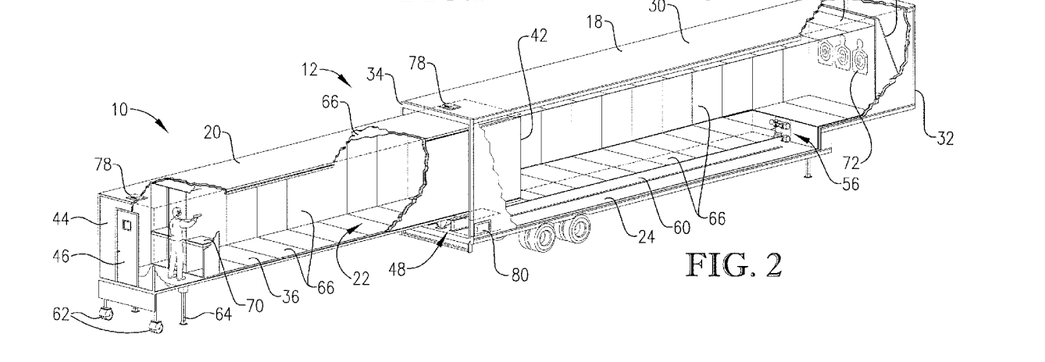
FIG. 2 is a perspective view of the trailer of FIG. 1.
Figure 3:
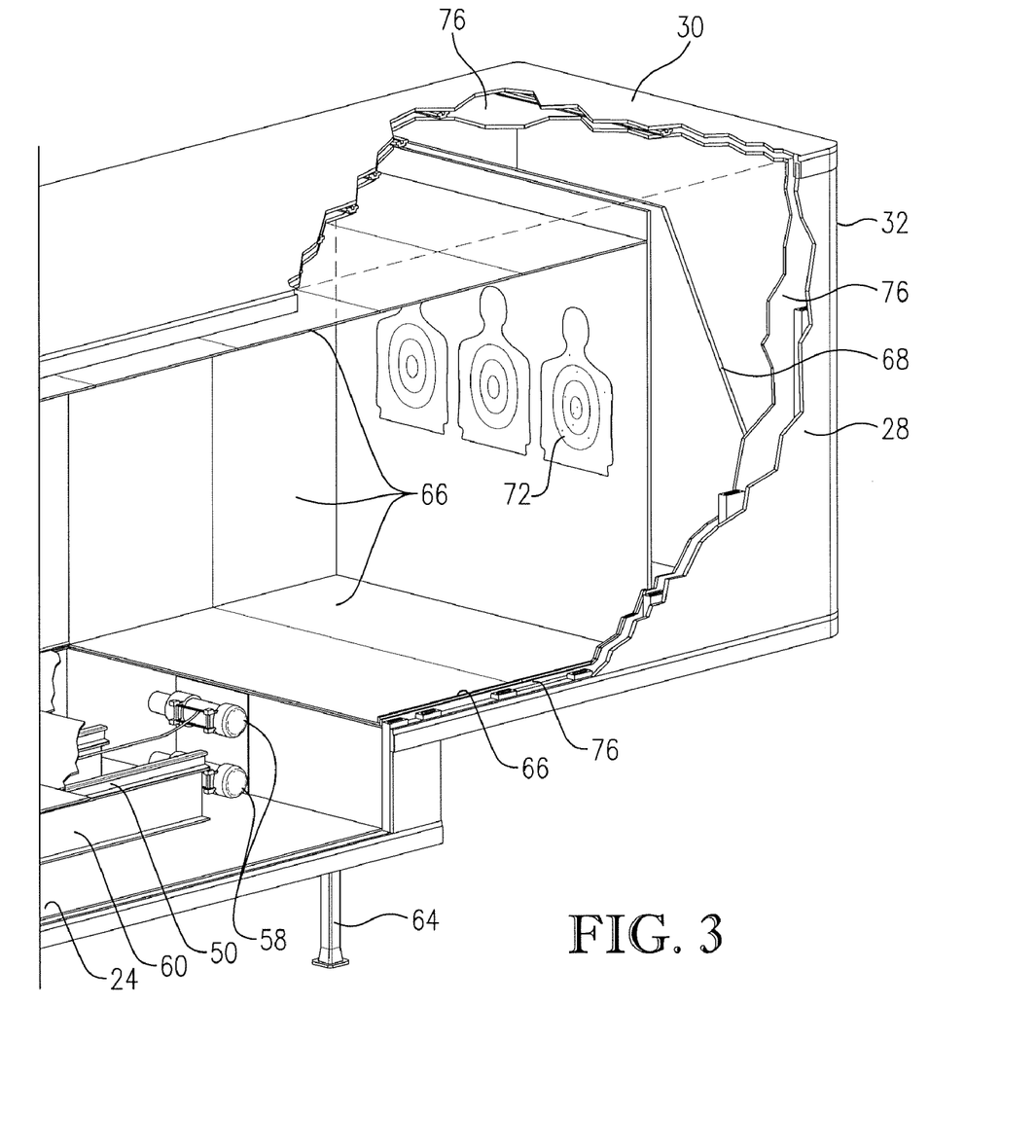
FIG. 3 is a perspective view of the trailer of FIG. 2 showing a first end of the trailer in more detail.
Figure 4:
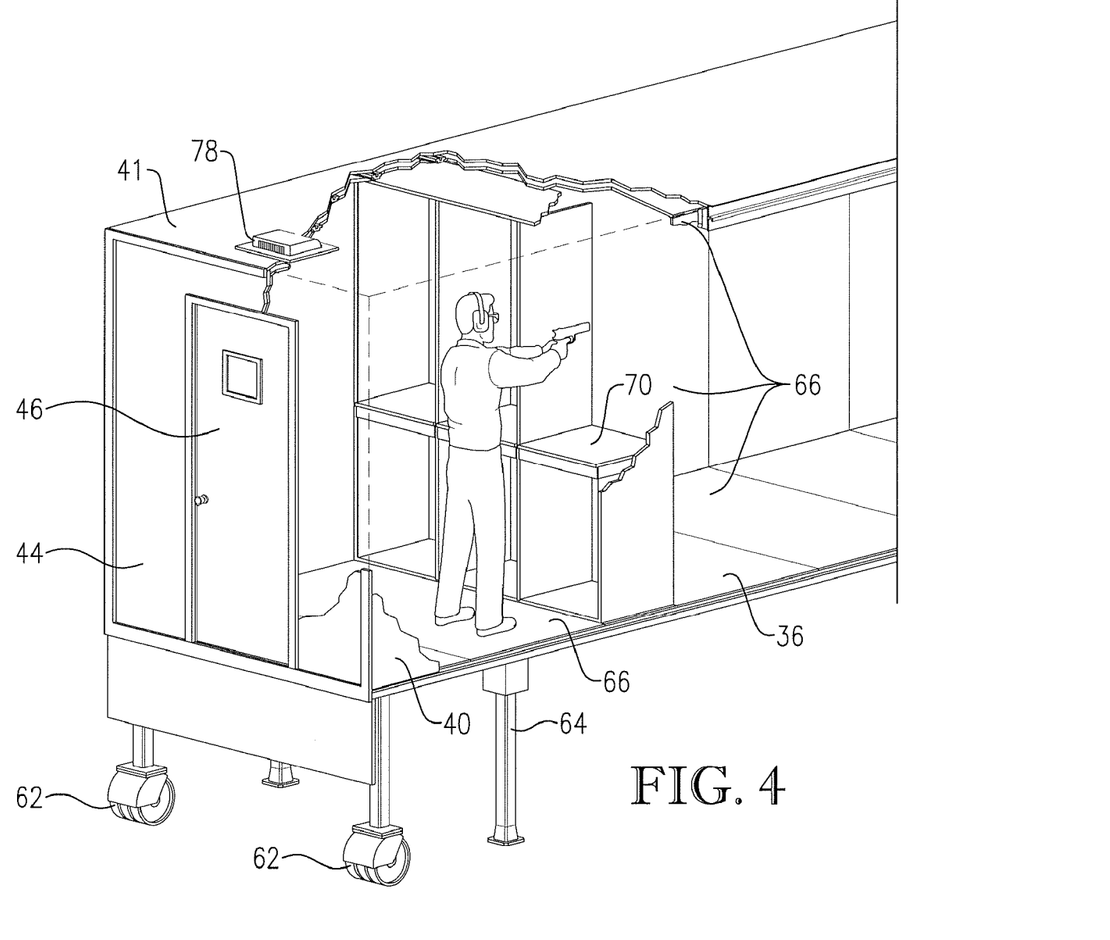
FIG. 4 is a perspective view of the trailer of FIG. 2 showing a second end of the trailer in more detail.
Figure 5:
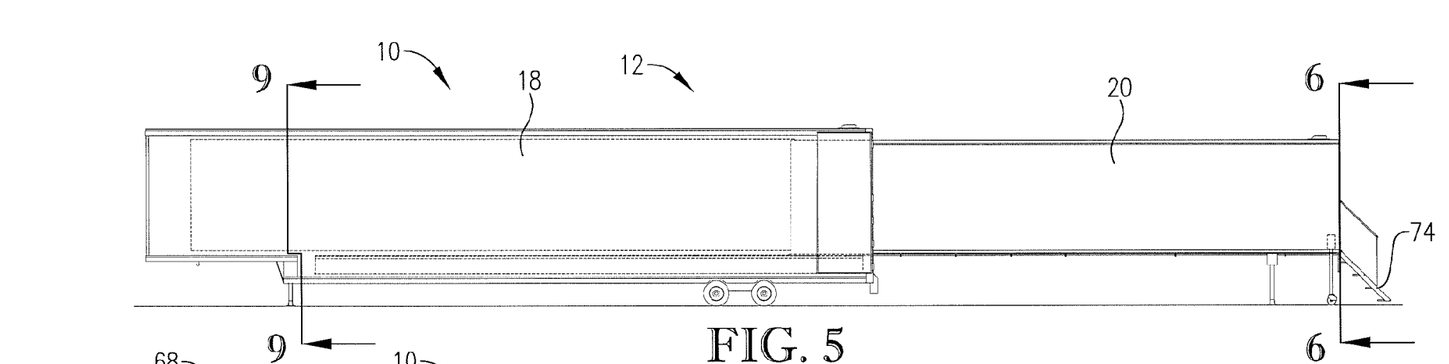
FIG. 5 is a side view of the trailer of FIGS. 1-4, the trailer being shown in an extended position.
Figure 6:
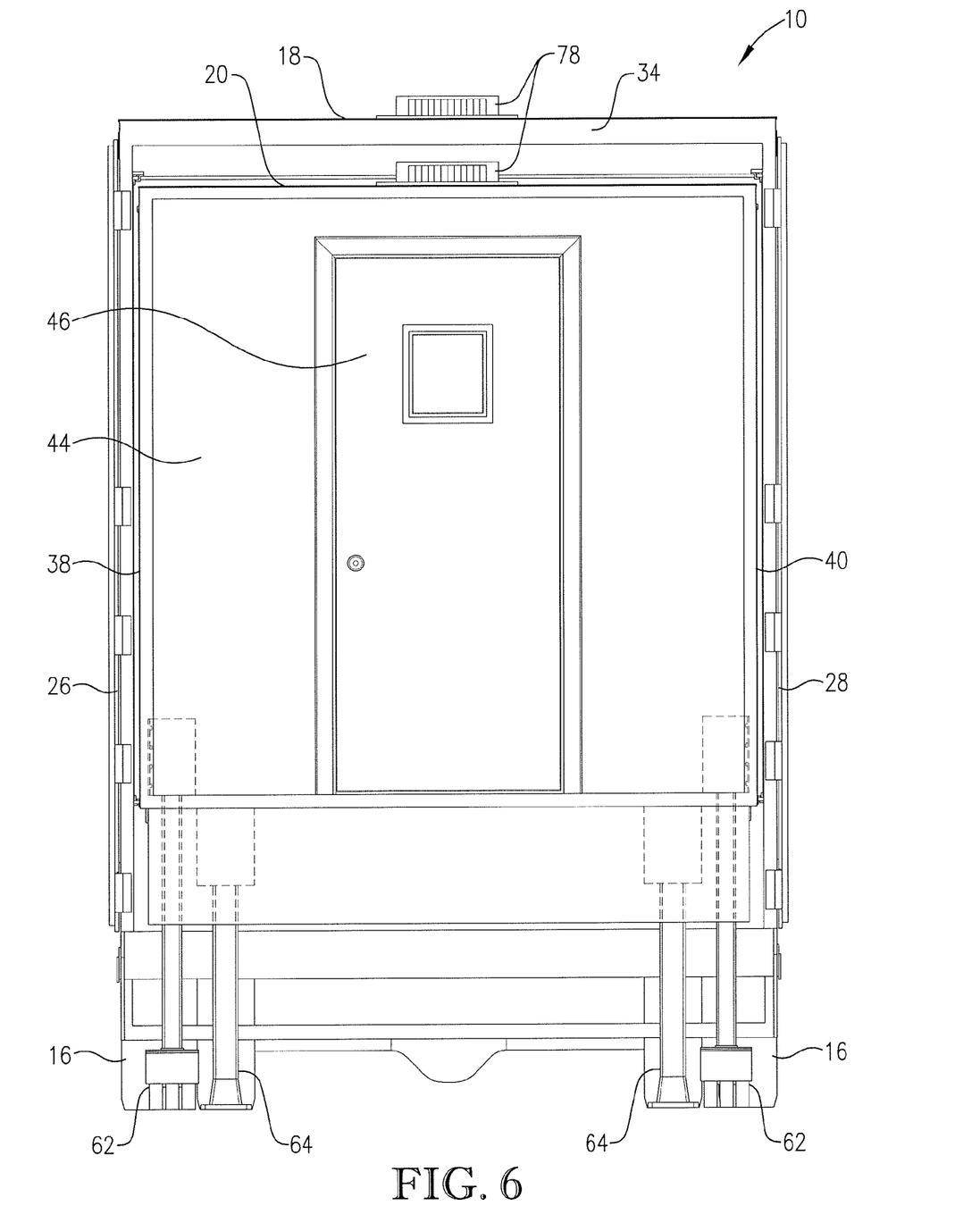
FIG. 6 is a rear view of the trailer along line 6 of FIG. 5.
Figure 7:
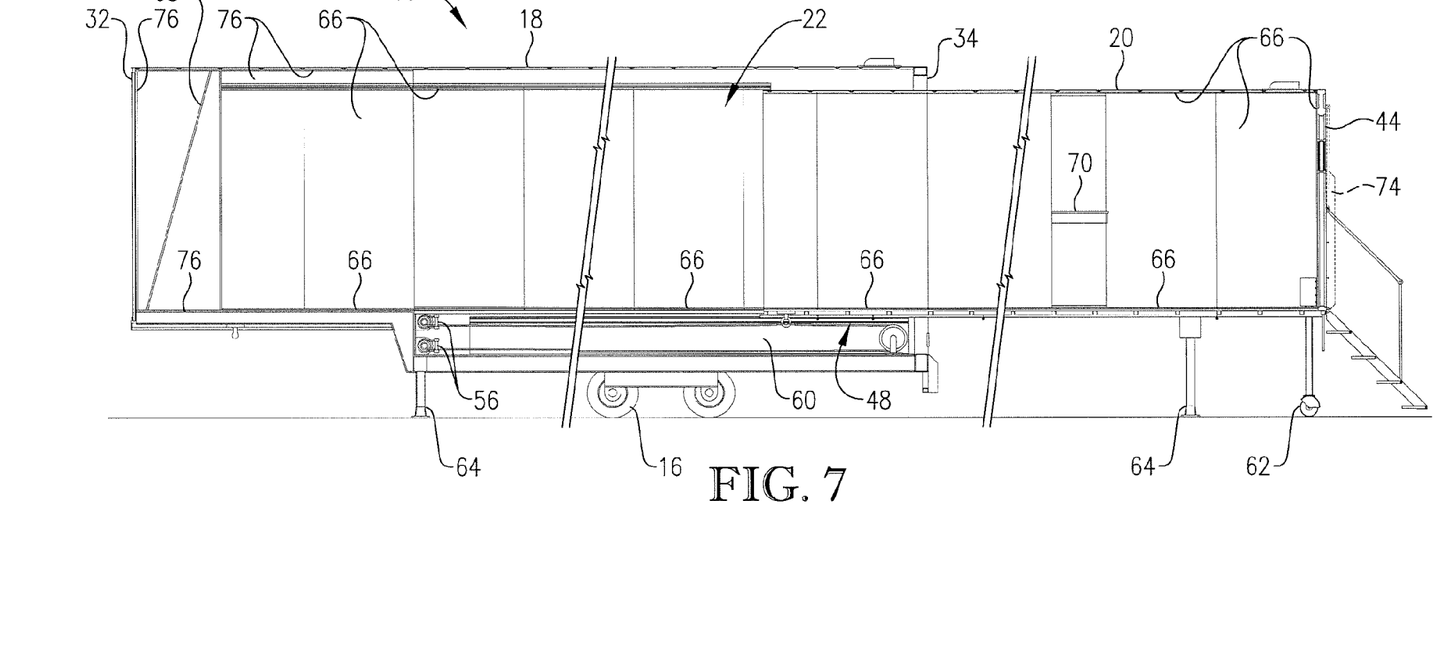
FIG. 7 is a side isometric view of the trailer of FIGS. 1-6.
Figure 8:
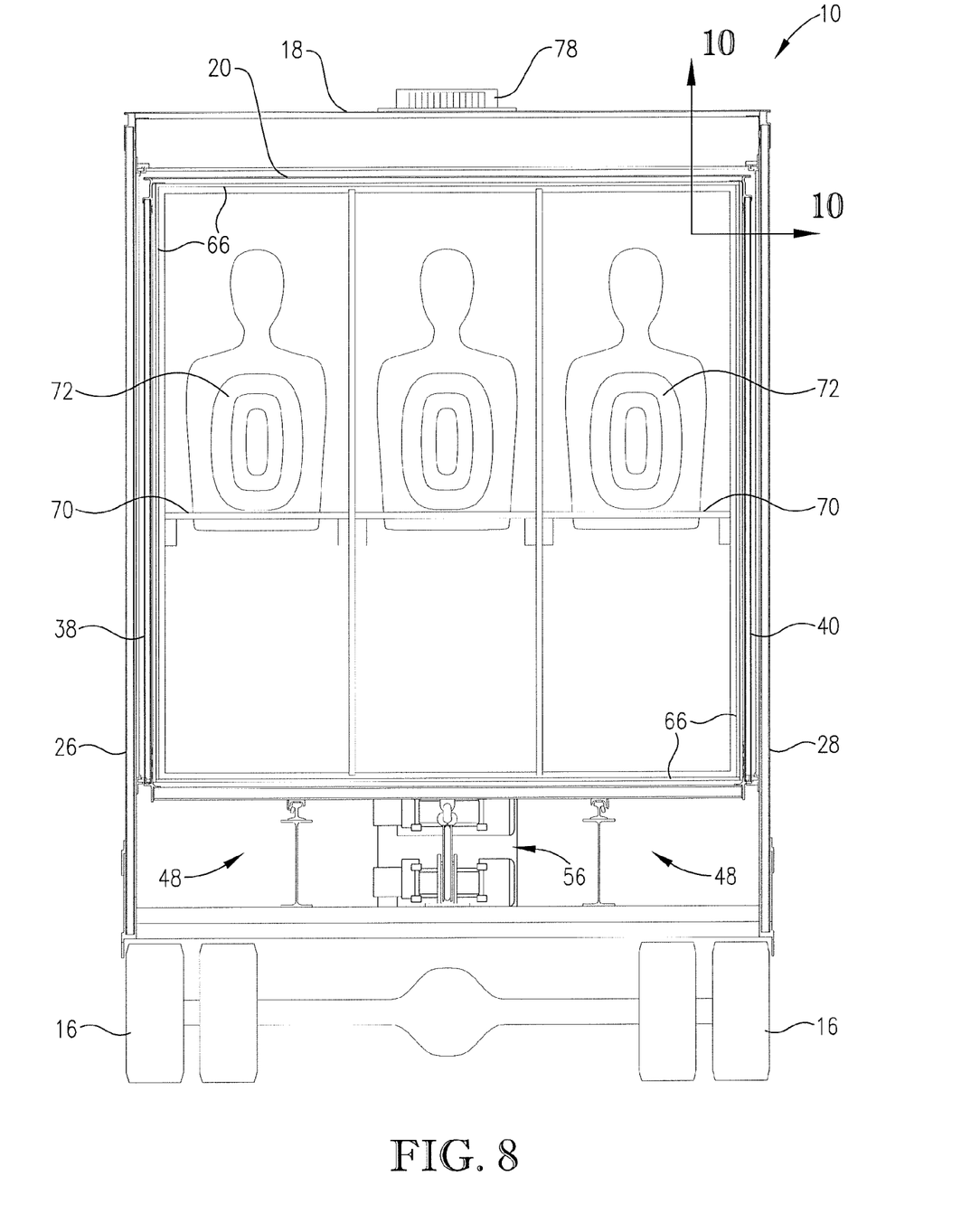
FIG. 8 is an isometric view along line 8 of FIG. 1.
Figure 9:
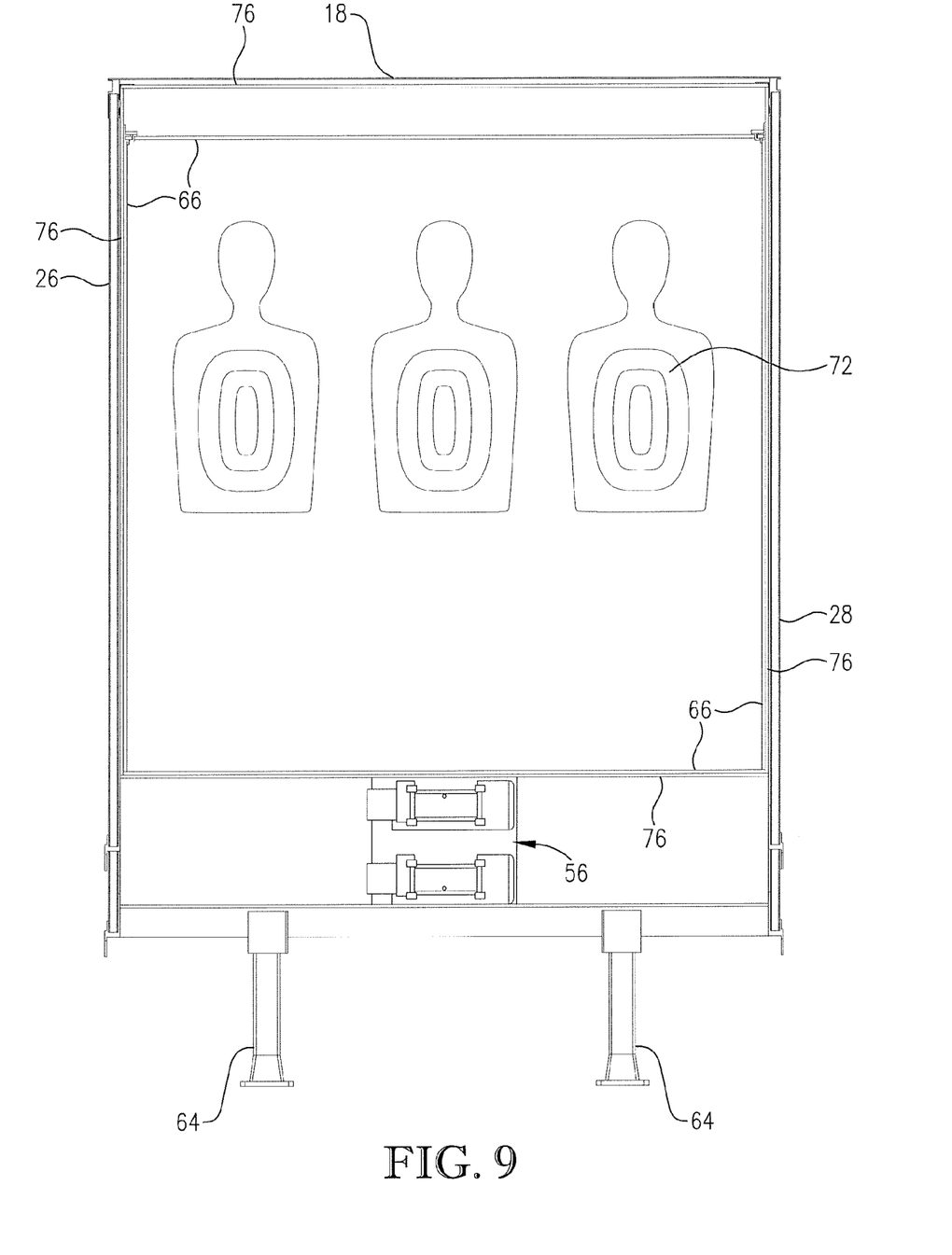
FIG. 9 is an isometric view along line 9 of FIG. 5.
Figure 10:
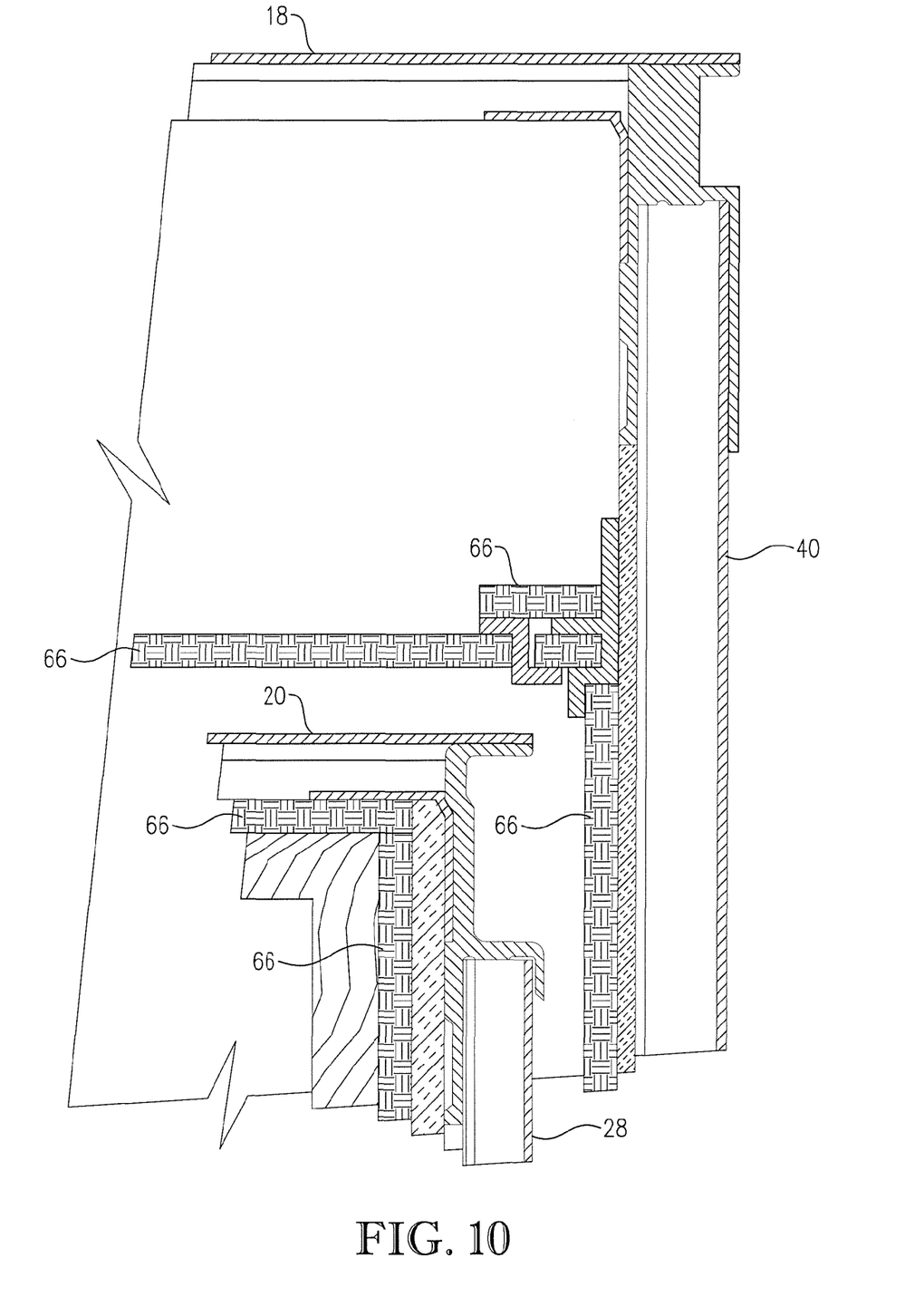
FIG. 10 is an isometric view along line 10 of FIG. 8, the view showing ballistic paneling and a side wall of the trailer in more detail.

Referring initially to FIGS. 1-3, a mobile target range trailer 10 is shown configured in accordance with various preferred embodiments of the present invention. The trailer 10 generally includes an extendible main body 12, a hitching element 14 coupled with the main body 12 to facilitate coupling the trailer 10 to a vehicle, and a plurality of trailer wheels 16 coupled with the main body 12 to facilitate movement of the trailer 10.

The main body 12 comprises a telescopically intercoupled outer section 18 and inner section 20. As discussed below in more detail, the main body 12 is shiftable between a retracted and an extended position. The outer section 18 and the inner section 20 cooperatively define an interior space 22. As shown in FIG. 1, the outer section 18 and the inner section 20 preferably present a generally rectangular cross section. Utilization of sections having a rectangular cross section is desirable as it enables the main body to present a generally conventional trailer-like appearance. However, the outer section 18 and the inner section 20 may provide any shape or appearance and need not be limited to rectangular forms.

The inner section 20 is configured to be at least partially retained in the outer section 18 for telescopic intercoupling. For example, the width and height of the interior portion of the outer section 18 are greater than the width and height of the exterior portion of the inner section 20 to enable the inner section 20 to be at least partially retained within the outer section 18. Preferably, the length of the interior portion of the outer section 18 is greater than the length of the exterior portion of the inner section 20 to enable the inner section 20 to be completely retained within the outer section 18, as is discussed in more detail below.

In the various embodiments, the outer section 18 presents dimensions substantially similar to that of a conventional trailer unit. Preferably, the outer section 18 has a length of approximately between forty and sixty feet, a width approximately between ninety and one-hundred-twenty inches, and a height between twelve and fourteen feet from the ground. More preferably, the outer section 18 has a length of approximately fifty-three feet and a width of approximately one-hundred-two inches. Utilization of an outer section having a fifty-three-foot length maximizes the space provided the trailer 10 without requiring special permits, fees, roadways, or exceptions due to U.S. state and federal regulations that generally limit single trailer length to fifty-three feet. However, as should be appreciated by those skilled in the art, the outer section 18 may present any dimensions operable to be towed or otherwise transported by a vehicle, and need not be limited to the dimensions articulated above.

The outer section 18 includes a floor 24, two opposed side walls 26, 28 extending from the floor 24, and a ceiling 30 extending between the side walls 26, 28. Thus, as discussed above, the outer section 18 may present a generally rectangular appearance. However, to facilitate towing by a semi-truck or other similar vehicle, portions of the floor 24 may be raised in a generally conventional manner to enable a first end 32 of the outer section 18 to be partially supported by the semi-truck itself. A second end 34 of the outer section 18 may include conventional trailer doors and closing mechanisms to enable access to the inner section 20 and interior space 22.

The inner section 20 presents dimensions less than those provided by the outer section 18 to enable at least a portion of the, and preferably the entire, inner section 20 to be retained within the outer section 18. Thus, in various embodiments the inner section 20 may present any dimensions operable to be retained within a conventional trailer unit. Preferably, the inner section 20 has a length of between approximately thirty and fifty feet, a width between approximately eighty and one-hundred ten inches, and a height between eleven and thirteen feet. More preferably, the inner section 20 has a length of approximately forty feet and a width of approximately ninety-inches. Such a configuration enables the inner section 20 to be completely retained within an outer section having dimensions substantially similar to that of a conventional fifty-three-foot semi-trailer.

The inner section 20 generally includes a floor 36, two opposed side walls 38, 40 extending from the floor 36, and a ceiling 41 extending between the side walls 38, 40. The inner section 20 additionally includes a first end 42 and a second end 44. The first end 42 of the inner section 20 is preferably operable for insertion into the outer section 18 and is generally open and free of significant obstructions. The second end 44 of the inner section 20 is substantially closed but may include an entry door 46 to enable access to the inner section 20 and interior space 22. The entry door 46 is preferably a ballistic entry door operable to substantially stop, slow, or deflect any projectiles accidentally fired at the entry door 46. Preferably, the entry door 46 is comprised of AR500 grade steel or equivalents thereof and includes a window comprised of ballistic glass to enable safe viewing of the interior space 22.

The interior space 22 is generally defined by the space between the first end 32 of the outer section 18 and the second end 44 of the inner section 20. However, as should be appreciated, the main body 12, including the outer section 18 and the inner section 20, may include other walls or structures such that the interior space 22 is not necessarily defined by the entire volume between the first end 32 of the main body 12 and the second end 44 of the inner section 20.

The outer section 18 and the inner section 20 may be telescopically intercoupled by merely placing the inner section 20 within the outer section 18. Thus, the intercoupling utilized by the present invention does not require the use of additional elements or moving parts. However, to facilitate shifting of the main body 12 and extension and retraction of the inner section 20 from the outer section 18, as described in more detail below, the main body 12 may include one or more intercoupling elements 48.

Figure 11:
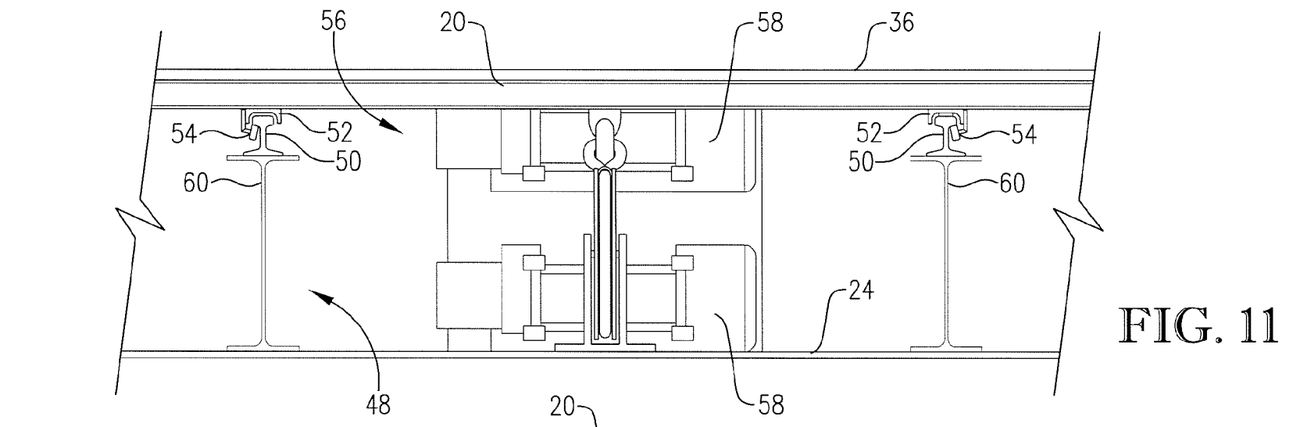
FIG. 11 is a front view of intercoupling elements operable to be utilized by the trailer of FIGS. 1-10.

As shown in FIG. 11, the intercoupling elements 48 may include a rail 50 axially coupled with the outer section 18 and a channel 52 axially coupled with the inner section 20 and operable to slidably engage the rail 50. Preferably, the rail 50 is fixedly coupled to or above the floor 24 of the outer section 18 and the channel 52 are fixedly coupled to the bottom of the exterior of the inner section 20 to enable the inner section 20 to be at least partially supported by the rail 50. However, in various embodiments the rail 50 may be coupled with the ceiling 30 of the outer section 18 and the channel 52 may be coupled with the top of the exterior of the inner section 20.

The rail 50 and the channel 52 may comprise any elements operable to slidably or shiftably interlock. As shown in FIG. 11, the rail 50 may be comprised of generally conventional railroad rail material such as 25-lb/3 feet railroad rail and the channel 52 may present a generally U-shaped appearance to at least partially engage two or three sides of the rail 50. Inner portions of the channel 52 may be coated or otherwise affixed with a limited friction coating to facilitate sliding or shifting of the channel 52 on the rail 50. For example, a frictionless plastic slider pad may be coupled with portions of the channel 52 that are operable to contact the rail 50.

The channel 52 also preferably includes a plurality of channel wheels 54 to facilitate shifting of the channel 52 on the rail 50. The channel wheels 54 are positioned on the interior of the channel 52 to rollably contact the rail 50 during sliding or shifting of the channel 52 on the rail 50. The channel wheels 54 are preferably positioned at spaced intervals along the channel 52. The channel wheels 54 may be of any size operable to couple with the channel 52 and rollably contact the rail 50.

In various embodiments, the intercoupling elements 48 include a pair of rails substantially similar to the rail 50 discussed above. Utilization of two or more rails facilitates support and shifting of the inner section 20 by evenly distributing a load among several rails. However, only one rail 50 may be employed by the present invention in some embodiments.

The intercoupling elements 48 may additionally or alternatively comprise other elements, such as rack and pinion systems, gear and chain systems, hydraulic or pneumatic systems, piston-type systems, etc. Preferably, the intercoupling elements 48 additionally include a mechanical driver 56 to facilitate extension and retraction of the main body 12.

Figure 12:
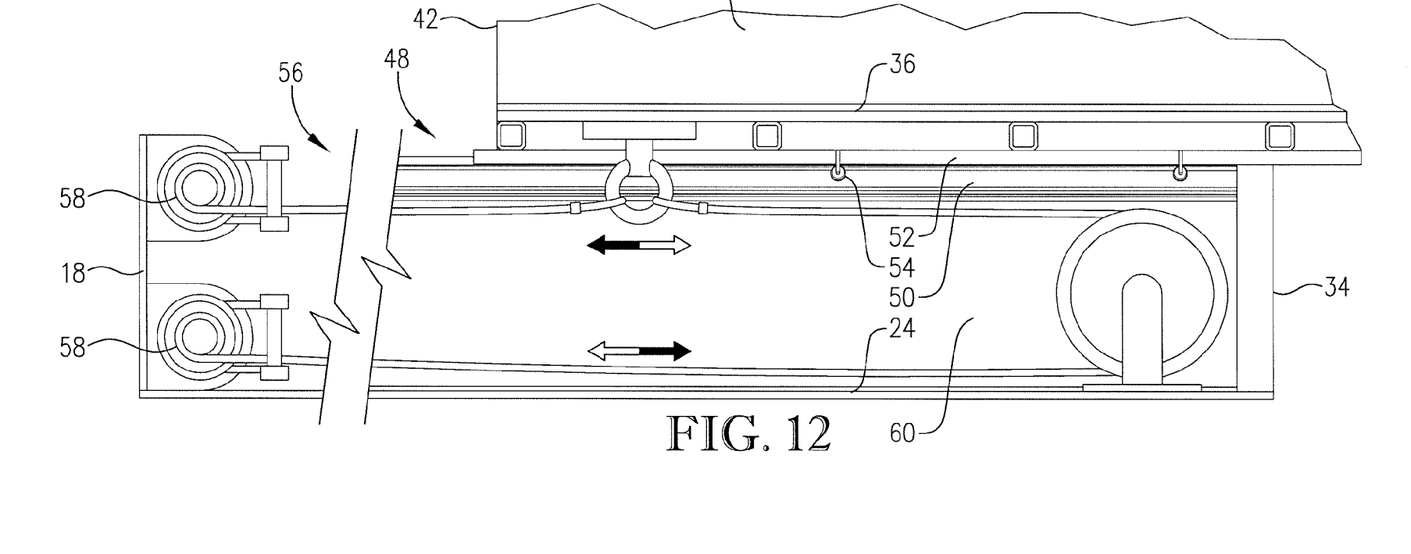
FIG. 12 is a side view of a mechanical driver operable to be utilized by the trailer of FIGS. 1-11.

In the various embodiments shown in FIG. 12, the mechanical driver may comprise a winch 58 secured to the floor 24 of the outer section 18 and coupled to the inner section 20 utilizing one or more pulleys and cables. The winch 58 may be utilized in a substantially conventional manner to extend and retract the inner section 20 from the outer section 18. In some embodiments, two or more winches may be utilized to extend and retract the inner section 20 from the outer section 18. As should be appreciated, the mechanical driver 56 may alternatively or additionally comprise other driving elements, such as hydraulic and pneumatic elements, electric and fuel-based motors and engines, etc.

As also shown in FIG. 11, the outer section 18 may additionally include a supporting element 60 fixedly secured to its floor 24. The supporting element 60 facilitates support of the inner section 20 within the outer section 18 by providing appropriate clearance between the floor 24 of the outer section 18 and the bottom of the exterior of the inner section 20. For instance, the intercoupling elements 48, such as the rail 50, may be secured to the supporting element 60 and not directly to the floor 24 of the outer section 18 to provide appropriate clearance and space for various trailer 10 components such as the mechanical driver 56.

The supporting element 60 may be any element operable to couple with the floor 36 of the outer section 18 and support and/or elevate at least a portion of the intercoupling elements 48 and/or inner section 20. Preferably, the supporting element 60 includes one or more steel I-beams fixedly secured to the floor 36 of the outer section 18 with the rail 50 being fixedly secured to the top of the one or more I-beams.

As shown in FIGS. 1-6, the inner section 20 preferably includes a retractable support wheel 62 operable to support the inner section 20 during at least a portion of the shifting of the main body 12. The retractable support wheel 62 is preferably coupled with the second end 44 of the inner section 20 and operable to extend therefrom when the second end 44 of the inner section 20 is extended past the second end 34 of the outer section 18. The length of the retractable support wheel 62 is preferably sufficient to rollably contact the ground during extension of the main body 12. In various embodiments the length of the retractable support wheel 62 when extended is approximately thirty inches. However, the retractable support wheel 62 may be sized and configured to function with any dimensioned trailer 10.

Preferably, portions of the retractable support wheel 62 are housed or retained within the interior space 22 proximate the second end 44 of the inner section 20. For instance, portions of the retractable support wheel 62 may project through the floor 36 of the inner section 20 and manually or automatically retract downward during extension of the main body 12. In various embodiments, the retractable support wheel 62 includes a plurality of 6-inch rigid wheels to provide adequate support for the inner section 20. Further, the inner section 20 may include a plurality of retractable support wheels configured in a substantially similar manner to the support wheel 62 discussed above and positioned at spaced intervals proximate the second end 44 of the inner section 20.

As also shown in FIGS. 1-6, the inner section 20 may additionally include one or more retractable outriggers 64. The outriggers 64 are configured to extend from the inner section 20 to support the inner section 20 after full extension of the main body 12. The outriggers 64 may be configured to retract into the interior space 22 or be coupled with or removably affixed to the exterior of the inner section 20. Preferably, the outriggers 64 are spaced apart from the retractable support wheel 62 to evenly support the inner section 20. The outriggers 64 may also be coupled with the outer portion 18.

The trailer 10 may also include at least one ballistic panel, and preferably a plurality of ballistic panels 66, positioned within the interior space 22. Preferably, the ballistic panels 66 substantially cover the side walls 26, 28 and ceiling 30 of the outer section 18 and the floor 36, side walls 38, 40, and ceiling 41 of the inner section 20. More preferably, the ballistic panels 66 cover any area viewable from within the interior space 22 when the main body 12 is in the extended position. Such a configuration provides a safe environment for users by ensuring that projectiles fired from within the interior space 22 do not ricochet or penetrate the main body 12 and expose users and bystanders to harm. However, the ballistic panels 66 may be positioned anywhere within the interior space 22, such as only in proximity to a target.

The ballistic panels 66 may be any material operable to substantially inhibit movement of a high-velocity projectile, such as the ballistic material commonly found in body armor and armored vehicles. The ballistic panels 66 are preferably each comprised of a 7/16 inch ballistic grade fiberglass cloth injected with a thermoset polyester resin, such as the ballistic panels sold under the trade name Armortex® by Safeguard Security Services, Ltd. of San Antonio, Tex. However, the ballistic panels 66 may be comprised of any puncture or projectile resistant material including Kevlar® or other commonly used ballistic materials.

The ballistic panels 66 may be coupled to various portions of the outer section 18 and inner section 20 utilizing conventional fasteners. Preferably, the ballistic panels 66 are coupled with the walls and ceilings of the main body 12 utilizing hidden fasteners, that is fasteners not viewable from within the interior space 22, or adhesives, to prevent ricochet caused by a projectile striking an exposed fastener.

Further, one or more of the ballistic panels 66 is preferably movable or repositionable to cover the floor 24 of the outer section 18 when the main body 12 is in the extended position. Specifically, as the inner section 20 is extended from the outer section 18, portions of the floor 24, intercoupling elements 48, and/or supporting element 60 may become exposed, as shown in FIG. 2. Thus, after extension of the inner section 20, the repositionable ballistic panel or panels are operable to be placed on top of the floor 24, intercoupling elements 48, and/or supporting element 60 to further protect the trailer 10, its users, and bystanders from harm. When the main body 12 is in the retracted position, the one or more repositionable ballistic panels may be stowed within the inner section 20 for transport. Further, one or more of the ballistic panels 66 may be coupled with interior portions of the second end 44 and entry door 46 to prevent projectiles from exiting the main body 12 at the second end 44.

The trailer 10 may also include a sloped projectile stop 68 to safely stop projectiles fired within the interior space 22. The sloped projectile stop 68 may be permanently affixed to portions of the outer section 18 and inner section 20 or be removable or repositionable. Preferably, the sloped projectile stop 68 is coupled proximate the first end 32 of the outer section 18 to maximize the range available for firing.

The sloped projectile stop 68 is preferably comprised of a rigid and durable material operable to stop and/or deflect high-velocity projectiles, such as bullets fired from firearms, from exiting the main body 12. The sloped projectile stop 68 is preferably comprised of one-half inch AR500 grade steel or equivalents thereof. However, the sloped projectile stop 68 may be comprised of any material operable to slow, deflect, or stop any type of fired or launched projectile.

The sloped projectile stop 68 is sloped to deflect projectiles towards the floor 24 of the outer section 18. In embodiments where the sloped projectile stop 68 is placed proximate or within the inner section 20, the sloping of the sloped projectile stop 68 deflects projectiles toward the floor 36 of the inner section 20. The slope of the sloped projectile stop 68 is preferably between five and fifty degrees relative to the vertical to facilitate proper projectile deflection. More preferably, the slope of the sloped projectile stop 68 is approximately 15 degrees relative to the vertical. In various embodiments, the trailer 10 may include a plurality of sloped projectile stops configured in a substantially similar manner to the sloped projectile stop 68 discussed above.

The trailer 10 may also include a user barricade 70 positioned within the interior space 22. The user barricade 70 provides a location for users to fire projectiles from and also prevents users and bystanders from accidentally walking in front of fired projectiles, other users, or targets. Preferably, the user barricade 70 is positioned opposite the sloped projectile stop 68 within the interior space 22 to maximize the range provided for projectile firing. Thus, users preferably fire from behind the user barricade 70 towards the sloped projectile stop 68.

The user barricade 70 preferably provides three firing positions for users, as shown in FIG. 2. In embodiments where the width of the inner section 20 is ninety inches, each firing section may have a width of approximately thirty inches. As should be appreciated by those skilled in the art, the user barricade 70 may be provided with conventional range equipment, such as stools, benches, lights, spotting scopes, etc.

Preferably, the trailer 10 additionally includes one or more targets 72 to be targeted by users. The targets 72 are preferably positioned proximate the sloped projectile stop 68 such that a user may fire at the targets 72 from the user barricade 70 with the projectiles being stopped or deflected by the sloped projectile stop 68.

The targets 72 may be substantially conventional targets that are operable to be safely targeted by users. In various embodiments, the targets 72 may be movable and include a substantially conventional indoor-range type pulley system. The pulley system enables paper or cardboard targets to be suspended in proximity to the sloped projectile stop 68 and retracted and extended to and from the user barricade 70. Further, the targets 72 may include pop-up targets, including spring-loaded silhouettes, and other repositionable targets to further increase the number of targets provided by the present invention.

The trailer 10 may also include a movable stairway 74 positionable proximate the entry door 46 to facilitate access to the interior space 22. The movable stairway 74 may be retractable to couple with an exterior of the second end 44 of the inner section 20 and/or the movable stairway 74 may be repositionable and stowed elsewhere in the trailer 10 when not in use.

Portions of the trailer 10 also preferably include reinforcing elements 76 operable to reinforce the main body 12 to prevent projectile penetration and associated harm to nearby individuals and property. For example, the main body 12 may be substantially comprised of conventional trailer materials, such as aluminum and thin steel, that are easily penetrated by high-velocity projectiles, such as bullets. Utilization of the reinforcing elements 76 reinforces these conventional trailer materials to render the trailer 10 ballistically sound.

Preferably, the reinforcing elements 76 are coupled with the various walls, floors, and ceilings of the outer section 18 and/or the inner section 20. In embodiments where the trailer 10 includes the ballistic panels 66, the reinforcing elements 76 are preferably directly coupled with the walls, floors, and ceilings of the outer section 18 and/or inner section 20 and the ballistic panels 66 are then coupled to the reinforcing elements 76. As shown in FIG. 2, such a configuration provides three-levels of projectile-stopping materials, the ballistic panels 66, the reinforcing elements 76, and the walls, floors, and ceilings of the main body 12 itself, to stop, deflect, and otherwise restrict the exiting of projectiles from the interior space 22.

The reinforcing elements 76 may be positioned around the periphery of the outer section 18 and inner section 22 to reinforce the area surrounding the entire interior space 22. However, due to utilization of the ballistic panels 66, various embodiments of the present invention due not require use of the reinforcing elements 76 around the entire periphery of the interior space 22. Thus, the reinforcing elements 76 may only be positioned in proximity to the sloped projectile stop 68 to reduce the weight of the trailer 10. For instance, in embodiments where the sloped projectile stop 68 is placed towards the first end 32 of the outer section 18, the floor 24, side walls 26, 28, and ceiling 30 in proximity to the first end 32 of the outer section 18 may include the reinforcing elements 76 due to the probability of errant projectiles in that area.

The reinforcing elements 76 may be comprised of any durable and rigid material. Preferably, the reinforcing elements 76 are comprised of ¼ inch AR500 grade steel, or equivalents thereof, to restrict the penetration of high-velocity firearm rounds.

Thus, to escape the main body 12, a projectile fired from the user barricade 70 towards the target 72 positioned in proximity to the sloped projectile stop 68 would have to penetrate: the target 72, the sloped projectile stop 68 (preferably comprised of ½ inch AR500 grade steel), the ballistic panels 66 (preferably comprised of Armortex® 7/16 inch ballistic fiberglass panels), the reinforcing elements 76 (preferably comprised of ¼ inch AR500 grade steel), and the first end 32 of the outer section 18. As should be appreciated by those skilled in the art, such a configuration is generally operable to stop any conventional high-velocity bullet from exiting the main body 12 and harming bystanders or nearby property.

The trailer 10 may additionally include one or more vents 78 operable to vent fumes from the interior space 22. As should be appreciated, the use of firearms within the generally enclosed main body 12 will lead to the accumulation of fumes and other vapors within the interior space 22. The vents 78 enable these fumes to be easily vented from the interior space 22 to provide a safe operating environment for users. The vents 78 may be operable to both vent fumes from the interior space 22 to outside of the main body 12 and to force fresh air from outside the main body 12 into the interior space 22. As shown in FIG. 2, the vents 78 are preferably positioned on the ceiling 41 of the inner section 20 above the user barricade 70. However, the vents 78 may be positioned anywhere on the main body 12 to facilitate use of the trailer 10.

As should be appreciated by those skilled in the art, the trailer 10 may additionally include other conventional trailer and RV equipment and devices, including lights, electrical wiring, HVAC equipment, electrical sockets, electrical generators, etc. Thus, for example, the trailer 10 may be air conditioned or heated to enable its use in any environment and may include a control panel 80 to control operation of the mechanical driver 56 or other trailer 10 elements.

The hitching element 14 is a substantially conventional trailer-hitch device operable to couple with a motor vehicle to tow or transport the trailer 10. For example, the hitching element 14 may be operable to couple the trailer 10 with a semi-truck or a conventional motor vehicle for towing as shown in FIG. 1.

The trailer wheels 16 are substantially conventional wheels to facilitate transport of the trailer 10. Preferably, the hitching element is positioned in proximity to the first end 32 of the outer section 18 and the trailer wheels 16 are positioned in proximity to the second end 34 of the outer section 18. In various embodiments the trailer wheels 16 may be removable or repositionable.

In operation, the main body 12 is operable to be shifted between the retracted position and the extended position. As discussed above, the retracted position is provided when the inner section 20 is substantially, and preferably entirely, retained within the outer section 18, and the extended position is provided when the inner section 20 is substantially extended from the outer section 18.

The trailer 10 is preferably transported when the main body 12 is in the retracted position. To transport the trailer 10, the hitching element 14 is conventionally coupled with a motor vehicle, such as a semi-truck, to enable the trailer 10 to be towed to any vehicle accessible location.

After arriving at a desired location, the trailer 10 may be decoupled from the motor vehicle or remain attached thereto. To maximize the area available for use, the main body 12 may be shifted from the retracted position to the extended position. To shift the main body 12, the mechanical driver 56, including the winch 58, may be utilized to extend the inner section 20. During extension of the inner section 20, the retractable support wheel 62 may be extended to contact the ground to support the inner section 20. After the inner section 20 is extended to the desired amount, the outriggers 64 may be deployed to stabilize the trailer 10. Further, the outriggers 64 may be utilized to level the trailer 10.

Preferably, the maximum dimension of the interior space 22 increases by at least about twenty percent when the main body 12 is shifted from the retracted position to the extended position. More preferably, the maximum dimension of the interior space 22 increases by at least about thirty percent, and most preferably forty percent, when the main body 12 is shifted from the retracted position to the extended position.

In various embodiments the maximum dimension of the interior space 22 is at least sixty feet, and preferably approximately at least seventy-five feet, when the main body 12 is in the extended position. As such, the present invention is operable to provide a full-sized seventy-five-foot target range utilizing a trailer that has a main body 12 that does not exceed approximately fifty-three feet in the retracted (transport) position. Thus, the trailer 10 may be conventionally towed without violating common U.S. federal and state trailer length limitations.

Further, by providing a seventy-five-foot (twenty-five yard) dimension, the present invention is operable to function as a qualifying target range. Specifically, law enforcement, military, and sporting groups require various performance levels as tested on a seventy-five foot range. Thus, the present invention enables users to qualify on a mobile, and easily transported, target range.

To easily access the interior space 22, the moveable stairway 74 may be positioned in proximity to the entry door 46. For example, the moveable stairway 74 may be manually positioned by the entry door 46 and/or the moveable stairway 74 may retract from a stowed position in proximity to the second end 44 of the inner section 20.

To protect the floor 24 of the outer section 18, one or more of the ballistic panels may be repositioned after extension of the main body 12 to cover any areas exposed during extension of the inner section 20. For instance, a repositionable ballistic panel may be moved from the inner section 20 and placed on top of the rail 50 to protect the trailer 10 and its users.

One or more users may then enter the interior space 22 through the entry door 46. In various embodiments, three users may simultaneously shoot or otherwise launch a projectile within the trailer 10 due to the spacing providing by the user barricade 70. After the users have entered the interior space 22, the entry door 46 is preferably closed to provide an enclosed ballistically sound environment.

The targets 72 may be conventionally positioned by the users or trailer staff for targeting. Preferably, the users stand or sit in proximity to the user barricade 70 and fire at targets 72 positioned in proximity to the sloped projectile stop 68 at the first end 32 of the outer section 18. As should be appreciated, the interior space 22 may be configured in any orientation and the users are not limited to using firearms, as bows, air-powered weapons, thrown projectiles, etc, may be utilized within the interior space 22. If firearms or other gas producing weapons are utilized, the interior space 22 may be vented utilizing the vents 78.

Preferably, only frangible ammunition is utilized within the interior space 22. Utilization of frangible ammunition, in comparison to conventional types of firearm ammunition, reduces wear on the components of the trailer 10, such as the sloped projectile stop 68 and ballistic panels 66, prevents harmful ricochet, prevents penetration of the main body 12, and provides a safer operating environment. For example, after striking the sloped projectile stop 68, the frangible bullets disintegrate into harmless and low-velocity pieces.

To move the trailer 10 to another position the above steps may be repeated. Specifically, the main body 12 may be shifted from the extended to the retracted position by retracting the inner section 20 into the outer section 18. The main body 12 in the retracted position may be coupled with the motor vehicle and towed in a conventional manner to another location.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A mobile target range trailer comprising:
    an extendible main body having telescopically intercoupled outer and inner sections wherein the inner section includes an inner section floor and the outer section includes an outer section floor,
    wherein the outer and inner sections cooperatively define an interior space,
    wherein the main body is shiftable between a retracted position and an extended position,
    wherein the inner section is operable to be completely retained within the outer section when the main body is in the retracted position to facilitate transport of the mobile target range trailer,
    wherein the length dimension of the main body does not exceed fifty-three feet when the main body is in the retracted position and the maximum dimension of the interior space is at least sixty feet when the main body is in the extended position;

a mechanical driver coupled with the main body and operable to shift the main body between the retracted and extended positions;

a ballistic panel positioned within the interior space;

a sloped projectile stop positioned within the interior space;

a hitching element coupled to the main body proximate a first end of the body;

a plurality of trailer wheels coupled to the main body proximate a second end of the body; and an I-shaped support beam for supporting the inner section in the outer section, a rail coupled to the support beam; and a U-shaped channel coupled to the floor of the inner section for shiftably engaging the rail;

wherein the support beam is positioned above the outer section floor and below the inner section floor, wherein the support beams are secured to the outer section floor such that the support beams remain fixed relative to the outer section when the main body is in the retracted position, when the main body is in the extended position, and when the main body is shifted between the extended and retracted positions, wherein said inner section presents a front end and a rear end, wherein the front end of the inner section is supported on the support beams when the main body is in the retracted position, when the main body is in the extended position, and when the main body is shifted between the extended and retracted positions, wherein the front end of the inner section moves past the trailer wheels when the main body is shifted between the extended and retracted positions.

2. The mobile target range trailer of claim 1, wherein the outer and inner sections each include side walls and a ceiling extending between the side walls, the side walls and top walls being substantially covered with one or more ballistic panels.

3. The mobile target range trailer of claim 1, wherein the maximum dimension of the interior space is at least approximately seventy-five feet when the main body is in the extended position.

4. The mobile target range trailer of claim 1, wherein the inner section includes a retractable support wheel operable to rollingly contact the ground and support the inner section on the ground during at least a portion of the shifting of the main body.

5. The mobile target range trailer of claim 1, wherein the inner section includes a vent operable to exhaust fumes from the interior space.

6. The mobile target range trailer of claim 1, further including a rail coupled to the support beam and a channel coupled to the floor of the inner section, wherein the channel is configured to shiftably engage the rail.

7. The mobile target range trailer of claim 6, wherein the channel includes a plurality of channel wheels to facilitate shifting of the main body.

8. The mobile target range trailer of claim 1, wherein the maximum dimension of the interior space increases by at least about forty percent when the main body is shifted from the retracted position to the extended position.

9. The mobile target range trailer of claim 1, further including a user barricade positioned within the interior space.

\* \* \* \* \*